United States Patent Office 2,868,498
Patented Jan. 13, 1959

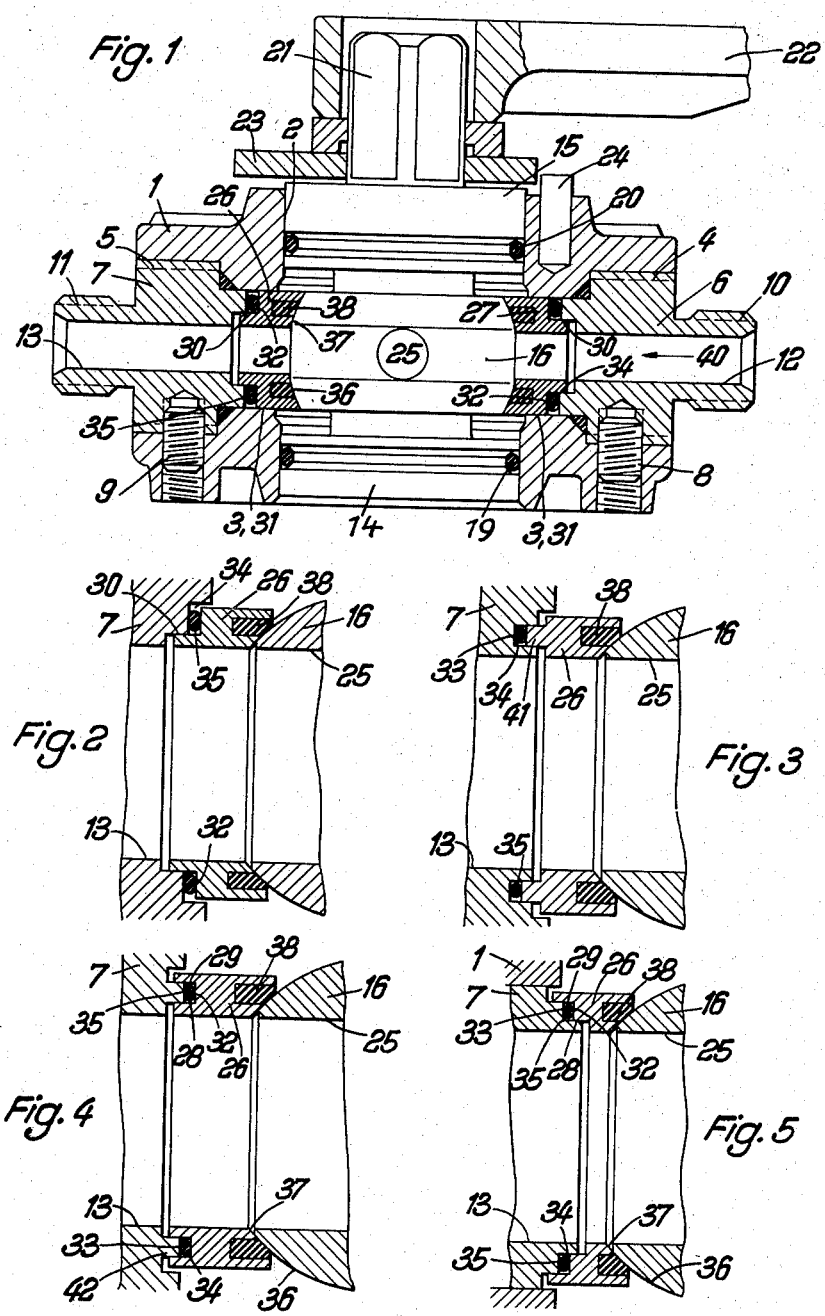

2,868,498

SHUT-OFF COCK WITH ANNULAR PISTON SEALING MEANS FOR THE BALL PLUG

Rudolf Kaiser, Ettlingen, Baden, Germany

Application April 17, 1956, Serial No. 578,754

Claims priority, application Germany February 7, 1956

4 Claims. (Cl. 251—172)

The invention relates to a shut-off cock with ball plug, which is sealed by annular pistons which are urged by the liquid pressure against its surface, which surrounds the inflow and outflow openings of the shut-off cock housing, and are arranged to be longitudinally displaceable in the said housing, sealing elements mounted in annular grooves bearing against the rear side of the said pistons remote from the plug.

The object of the invention is to develop a shut-off cock of this type further with a view to producing a simpler and cheaper construction. According to the invention this problem is solved in that the rear side, remote from the cock plug, of each of the two annular pistons which have the same internal diameter as the throughflow bore of the plug and of the connecting sleeves of the cock housing, encloses, together with a surface of the cock housing or of its connecting sleeves which is parallel to the said rear side, and with the two or only one guide surface of the annular piston which extend co-axially to the throughflow bore, and/or the guide surfaces of the cock housing or its connecting sleeves, an annular compartment which is of rectangular cross-section and whose axial depth and radial depth are such that the cross-sectional diameter of the sealing ring mounted therein, when the said ring is in the non-compressed condition, is greater than the axial annular groove depth and less than or at least as great as the radial width of the annular groove.

The rear side of each of the two annular pistons remote from the plug can be provided with a projecting annular ridge which has the radial width of the annular compartment, and which guides the annular piston axially in the connecting sleeves of the shut-off cock housing or in the said housing. Alternatively, it is also possible to cut into the rear side of the annular piston remote from the plug and annular recess of rectangular cross-section which has the radial width of the annular compartment receiving the sealing ring. Projecting from a wall situated perpendicularly to the throughflow bore of the shut-off cock and provided on the connecting sleeves of the shut-off cock housing or on the said housing is an annular guide ridge which projects into the aforesaid annular recess.

Further details of the invention will become apparent from the constructional examples which are described hereinafter with reference to Figs. 1 to 5.

Fig. 1 is a longitudinal sectional view of a shut-off cock constructed according to the invention.

Figs. 2, 3, 4 and 5 show various constructional forms of the guide walls of the annular piston which bound the annular groove which serves to receive the sealing ring, the cock housing and the connecting sleeves thereof.

The shut-off cock with ball plug illustrated in Fig. 1 comprises a housing 1 with transverse bore 2 and a longitudinal bore 3 which widens at both ends into tapped holes 4 and 5. Screwed into the tapped holes 4 and 5 are connecting pieces 6 and 7, which are fixed by locking screws 8 and 9. The connecting pieces 6 and 7 are formed with external screwthreading 10 and 11 for connection to hose or pipe lines, and also with throughflow bores 12 and 13.

Mounted in the transverse bore 2 of the housing 1 is a ball plug 16 carrying cylindrical extensions 14 and 15. For sealing purposes, sealing rings 19 and 20 are arranged in annular grooves 17 and 18 of the cylindrical extensions 14 and 15. Fixedly connected to the cylindrical extension 15 is a square shaft 21 on to which an actuating lever 22 and a recessed abutment disc 23 are mounted, the latter co-operating with a stop pin 24 inserted in the housing 1 in order to limit the rotary movement of the ball plug 16. The ball plug 16 can be rotated by means of the control lever 22 so far that its bore 25 permits or blocks the through flow of the medium being controlled.

In order to seal the ball plug 16, annular pistons 26 and 27 are arranged in the longitudinal bore 3 of the housing 1 co-axially to the throughflow bores 12 and 13 of the connecting pieces 6 and 7. Each annular piston comprises two cylindrical side surfaces 28 and 29 which are arranged concentrically to one another and which co-operate with corresponding guide surfaces 30 and 31 of the housing 1. The guide surface 31 is formed by the wall of the throughflow bore 3. A limited annular compartment is formed by the cylindrical side surfaces 28 and 29 of the annular piston 26 or 27 and by the guide surfaces 30 and 31 of the housing 1, and also by the rear side 32 of the annular piston 26 or 27 and a housing surface 33 which extends transversely to the throughflow bore. A so-called O-ring of resilient material is arranged in the said compartment.

As best seen in Fig. 2, the annular compartment or chamber 34 is of rectangular cross section. Surfaces of annular piston 26 form the cylindrical inner face of compartment 34 and one annular side face, whereas surfaces of the connecting piece 7 of housing 1 form the outer cylindrical face and the second annular side wall of compartment 34.

The dimensions of the annular piston and housing surfaces are so chosen that the depth of the compartment 34 measured in the direction of flow which is the radial width of the compartment or chamber 34 is less than the cross-sectional diameter of the O-ring 35 arranged in the said compartment. As a result, the said O-ring exerts an elastic pressure on the annular piston 26 or 27 and presses the annular piston against the surface 36 of the ball plug 16. A sealing ring 38 of appropriate sealing material e. g. of rubber or synthetic material—more particularly ethylene polymers containing fluorine—is fitted into the front end 37 of the annular piston 26 or 27, the said front end being adapted to the shape of the ball plug 16. The mean diameter of the O-ring 35 situated in the compartment 34 behind the annular piston 26 or 27 corresponds in the untensioned condition approximately to the mean diameter of the annular compartment 34, whose radial width is, however, greater than the cross-sectional diameter of the O-ring 35, whereby the O-shaped packing ring 35 is arranged in the compartment 34 spaced from the inner and outer faces thereof when the packing ring 35 is in untensioned condition.

The internal diameter of the annular piston 26 or 27 corresponds to the diameter of the throughflow bores 12 and 13 of the connecting pieces 6 and 7 and to the diameter of the bore 25 of the ball plug 16. Each annular piston 26 or 27 is guided in the cock housing 1 by the cylindrical side surfaces 28 and 29 of the said annular piston and by the corresponding guide surfaces 30 and 31 of the said housing, in such manner that the pistons are longitudinally displaceable in said housing. The pressure of the flow medium can travel along the guide surfaces of the housing to the rear side of the annular piston 26 or 27, and press the latter, with a pressure corresponding to the pressure of the liquid, against the surface 36 of the ball plug 16. If the direction of flow is that indicated by the arrow 40, and the ball plug 16 is in the closed position, the flow medium passes into the compartment 34 behind the annular piston 27 along the guide surface 30 and urges the O-ring 35 in this compartment radially outwards so that it seals off the gap between the outer side surface 29 of the annular piston 27 and the guide surface 31 of the housing 1.

If the liquid under line pressure nevertheless reaches the annular piston 26 even when the ball plug 16 is in the closed position, the said liquid passes along the guide surface 31 of the housing 1 into the compartment 34 located at the rear side of the annular piston 26 and, as a result, presses the O-ring in this compartment radially inwards so that it seals off the gap between the inner guide surface 28 of the annular piston 26 and the guide surface 30 of the housing 1. In this way there builds up, at the rear side of the annular piston 26, a pressure which also urges the annular piston 26 against the surface 36 of the ball plug 16. The same effect is obtained in the reverse sense if the pressure drop is in the direction opposite to that indicated by the arrow 40.

Since, depending on which side the liquid arrives from into the compartment 34 behind the annular piston 26 or 27, the O-ring 35 blocks this compartment towards one or the other side and thus enables a pressure to be built up at the rear side of the annular piston which urges the annular piston against the surface of the ball plug 16, reliable sealing of the ball plug 16 can also be ensured if an annular piston of this kind is provided only at one side of the ball plug. In this connection it is immaterial from which side the pressure comes.

Figs. 2 to 5 show the sealing means of the ball plug 16 on an enlarged scale. The sealing means illustrated in Fig. 2 differ from those shown in Fig. 1 merely in that the boundary walls of the compartment 34 consist only of guide surfaces of the connecting piece 7 and of the annular piston 26. Fig. 5 shows a modified construction.

In the constructional example according to Fig. 3, an annular ridge 41 which projects into an annular groove in the connecting piece 7 is provided at that rear side of the annular piston 26 remote from the ball plug 16. The annular piston 26 is guided in axially displaceable manner in the said annular groove.

Fig. 4 shows the reverse arrangement. Projecting from a wall of the connecting piece 7 which is disposed perpendicularly to the throughflow bore 13 is an annular ridge 42 which engages in an annular groove formed at the rear of the annular piston 26.

In all these cases an annular compartment 34, in which an O-ring 35 is arranged, is formed at the rear side of the annular piston.

I claim:

1. In a valve device, in combination, a valve housing member formed with a bore therethrough; a valve arranged in said housing member, said valve being formed with a passage therethrough and being movable between open and closed positions wherein said passage is in and out of registration with said bore, respectively; and sealing means interposed between said housing member and said valve, said sealing means including an annular sealing member coaxial with said bore of said housing member, said members being so shaped as to form between themselves an annular chamber of substantially rectangular cross-section bounded by an inner face, an outer face and two side faces, and a packing ring arranged in said chamber, said ring being made of a resilient material and being compressed between said side faces of said annular chamber and having, in untensioned condition, a mean diameter corresponding approximately to the mean diameter of said chamber and a radial width smaller than the radial width of said chamber.

2. In a valve device, in combination, a valve housing member formed with a bore therethrough; a valve arranged in said housing member, said valve being formed with a passage therethrough and being movable between open and closed positions wherein said passage is in and out of registration with said bore, respectively, and sealing means interposed between said housing member and said valve, said sealing means including an annular sealing member coaxial with said bore of said housing member, one of said members being formed with an annular channel-shaped groove of substantially rectangular cross-section and the other of said members being formed with a complementarily-shaped annular projection extending into and partly filling said groove so as to define together with said one member an annular chamber of substantially rectangular cross section bounded by an inner face, an outer face and two side faces; and a packing ring arranged in said groove, said ring being made of a resilient material and being compressed between said side faces of said chamber and having, in untensioned condition, a mean diameter corresponding approximately to the mean diameter of said chamber, and a radial width smaller than the radial width of said chamber.

3. In a valve device, in combination, a valve housing member formed with a bore therethrough; a valve arranged in said housing member, said valve being formed with a passage therethrough and being movable between open and closed positions wherein said passage is in and out of registration with said bore, respectively; and sealing means interposed between said housing member and said valve, said sealing means including an annular sealing member coaxial with said bore of said housing member, said housing member being formed with an annular channel-shaped groove of substantially rectangular cross-section and said sealing member being formed with a complementarily-shaped annular projection extending into and partly filling said groove so as to define together with said one member an annular chamber of substantially rectangular cross section bounded by an inner face, an outer face and two side faces; and a packing ring arranged in said groove, said ring being made of a resilient material and being compressed between said side faces of said chamber, and having, in untensioned condition, a mean diameter corresponding approximately to the mean diameter of said chamber and a radial width smaller than the radial width of said chamber.

4. In a valve device, in combination, a valve housing member formed with a bore therethrough; a valve arranged in said housing member, said valve being formed with a passage therethrough and being movable between open and closed position wherein said passage is in and out of registration with said bore, respectively; and sealing means interposed between said housing member and said valve, said sealing means including an annular sealing member coaxial with said bore of said housing member, said sealing member being formed with an annular channel-shaped groove of substantially rectangular cross-section and said housing member being formed with a complementarily-shaped annular projection extending into and partly filling said groove so as to define together with said one member an annular chamber of substantially rectangular cross section bounded by an inner face, an outer face and two side faces; and a packing ring arranged in said groove, said ring being made of a resilient material and being compressed between said side faces of said chamber, and having, in untensioned condition, a mean diameter corresponding approximately to the mean diameter of said chamber, and a radial width smaller than the radial width of said chamber.

References Cited in the file of this patent

UNITED STATES PATENTS

| | | |
|---|---|---|
| 2,109,042 | Bennett | Feb. 22, 1938 |
| 2,578,396 | Brown | Dec. 11, 1951 |
| 2,628,060 | Parker | Feb. 10, 1953 |
| 2,628,809 | Mikeska | Feb. 17, 1953 |
| 2,653,791 | Mueller | Sept. 29, 1953 |
| 2,661,926 | Resek | Dec. 8, 1953 |

FOREIGN PATENTS

| | | |
|---|---|---|
| 716,610 | Great Britain | Oct. 13, 1954 |

Notice of Adverse Decision in Interference

In Interference No. 93,063 involving Patent No. 2,868,498, R. Kaiser, Shut-off cock with annular piston sealing means for the ball plug, final judgment adverse to the patentee was rendered Mar. 26, 1964, as to claim 1.

[*Official Gazette August 25, 1964.*]